(12) United States Patent
Bergamo

(10) Patent No.: US 8,128,392 B2
(45) Date of Patent: Mar. 6, 2012

(54) MACHINE FOR ROTATIONAL MOLDING WITH HEATED MOLD AND WITH FACILITATED PART EXTRACTION

(75) Inventor: Lorenzo Bergamo, Bergamo (IT)

(73) Assignee: Persico S.p.A., Nembro (IT)

( * ) Notice: Subject to any disclaimer, the term of this patent is extended or adjusted under 35 U.S.C. 154(b) by 297 days.

(21) Appl. No.: 12/450,162

(22) PCT Filed: Mar. 11, 2008

(86) PCT No.: PCT/EP2008/001917
§ 371 (c)(1),
(2), (4) Date: Dec. 29, 2009

(87) PCT Pub. No.: WO2008/110336
PCT Pub. Date: Sep. 18, 2008

(65) Prior Publication Data
US 2010/0143519 A1 Jun. 10, 2010

(30) Foreign Application Priority Data
Mar. 14, 2007 (IT) .......................... MI2007A000510

(51) Int. Cl.
*B29C 41/06* (2006.01)
*B29C 41/46* (2006.01)
*B29C 41/52* (2006.01)
(52) U.S. Cl. .. 425/150; 425/429; 425/812; 425/DIG. 60
(58) Field of Classification Search ................. 425/112, 425/116, 117, 150, 405.1, 429, 435, 812, 425/DIG. 60
See application file for complete search history.

(56) References Cited

U.S. PATENT DOCUMENTS

| 3,856,452 | A | * | 12/1974 | Amado, Jr. ..................... | 425/429 |
| 3,966,386 | A |   | 6/1976 | Beyer-Olsen et al. | |
| 4,571,320 | A | * | 2/1986 | Walker .......................... | 425/437 |
| 4,576,560 | A | * | 3/1986 | Herman ........................ | 425/412 |
| 5,868,979 | A | * | 2/1999 | Glenn ........................... | 425/435 |

(Continued)

FOREIGN PATENT DOCUMENTS
EP 1364764 11/2003
(Continued)

OTHER PUBLICATIONS

"Persico to Offer Fully Automated Rotational Molding Equipment through American Strategic Partners." Rotoworld Magazine, Feb. 2007, pp. 20-23.

(Continued)

*Primary Examiner* — Richard Crispino
*Assistant Examiner* — Thukhanh Nguyen
(74) *Attorney, Agent, or Firm* — Jacobson Holman PLLC

(57) ABSTRACT

A machine for rotational molding of products comprises means (12, 14, 16, 17) for driven rotation of a mold around perpendicular axes (13, 15), means (22) for direct heating of the mold and means (21) for commanded opening of the mold in half molds. The machine further comprises combined means (23, 24, 25) for arresting in a predetermined position of the rotating means of the mold disengageable retaining means (26, 27) for retaining the product in a preset half mold, and evacuating means (28, 50) for evacuating the product that are suitable for being introduced between the open half molds when the rotating means is stopped in said predetermined position and which is suitable for receiving the product discharged from said preset half mold upon the release of the retaining means.

16 Claims, 4 Drawing Sheets

U.S. PATENT DOCUMENTS

| | | | |
|---|---|---|---|
| 6,893,247 B2 * | 5/2005 | Uytterhaeghe et al. | 425/397 |
| 7,165,964 B2 * | 1/2007 | Schuessler | 425/429 |

FOREIGN PATENT DOCUMENTS

| | | |
|---|---|---|
| GB | 1427192 | 3/1976 |
| GB | 2424206 | 9/2006 |
| JP | 07-186170 | 7/1995 |
| WO | WO 95/22449 | 8/1995 |
| WO | WO 01/05568 | 1/2001 |

OTHER PUBLICATIONS

"Persico Announces 30$^{th}$ Anniversary Leonardo Automation Seminary." Rotoworld Magazine, Aug. 2006, p. 16.
"Rotazionale Mutistrato." PastDesign, Jan. 2006, pp. 95-96.
International Search Report dated Jul. 16, 2008.

* cited by examiner

MACHINE FOR ROTATIONAL MOLDING WITH HEATED MOLD AND WITH FACILITATED PART EXTRACTION

This is a national stage of PCT/EP08/001,917 filed Mar. 11, 2008 and published in English, which has a priority of Italian no. MI2007 A000510 filed Mar. 14, 2007, hereby incorporated by reference.

The present invention refers to a rotational molding machine of innovative type with only the mold heated. In particular, a machine of such a type is proposed provided with features that enable the molded products to be extracted in a facilitated, also automated, manner.

The "rotational" molding technique provides for the use of a specific mold in which a preset quantity of plastics in liquid or powder form is deposited. After the mold has been closed the mold is rotated around two perpendicular axes and is heated so that the hot material becomes stratified on the walls of the mold. At the end of the process, the mold is cooled, reopened and the molded piece is removed.

In the field of rotational molding the product is commonly extracted from the mold by an operator who opens the mold and then removes the piece manually. In general, in order to perform this operation, the mold is taken, still closed, to the loading/unloading zone by the rotation machine on the two axes so as to be able to be opened. Such a manner of proceeding is necessary in the case of traditional machines that introduce and extract molds inside a heating kiln. However, such a system does not lend itself to simplification, acceleration and automation of the steps of opening and extracting the molded product.

Molding systems have also been proposed in which only the mold is heated by circulating suitable fluid in contact with the mold, so as to avoid the use of a kiln. However, there remains the problem of opening the mold and removing the molded product in an easy and, possibly, automated manner. In such machines when the mold is opened the piece may remain attached in a "random" manner to one of the parts of the mold (two or more) or may even fall outside the mold.

In view of this object, it has been decided to make, according to the invention, a machine for rotational molding of products, comprising means for motor-driven rotation of a mold around perpendicular axes, means for direct heating of the mold, means for commanded opening of the mold in half molds, characterized in that it comprises a combination of means for arresting in a predetermined position rotating means for rotating the mold, disengageable retaining means for retaining the product in a preset half mold, and evacuating means for evacuating the product, which evacuating means is suitable for being introduced between the open half molds when the rotating means is stopped in said predetermined position, and which is suitable for receiving the product discharged from said preset half mold upon the release of the retaining means.

In order to make clearer the explanation of the innovative principles of the present invention and the advantages thereof over the prior art, a possible embodiment applying such principles will be disclosed below by way of example with the help of the attached drawings. In the drawings.

Figure 1:
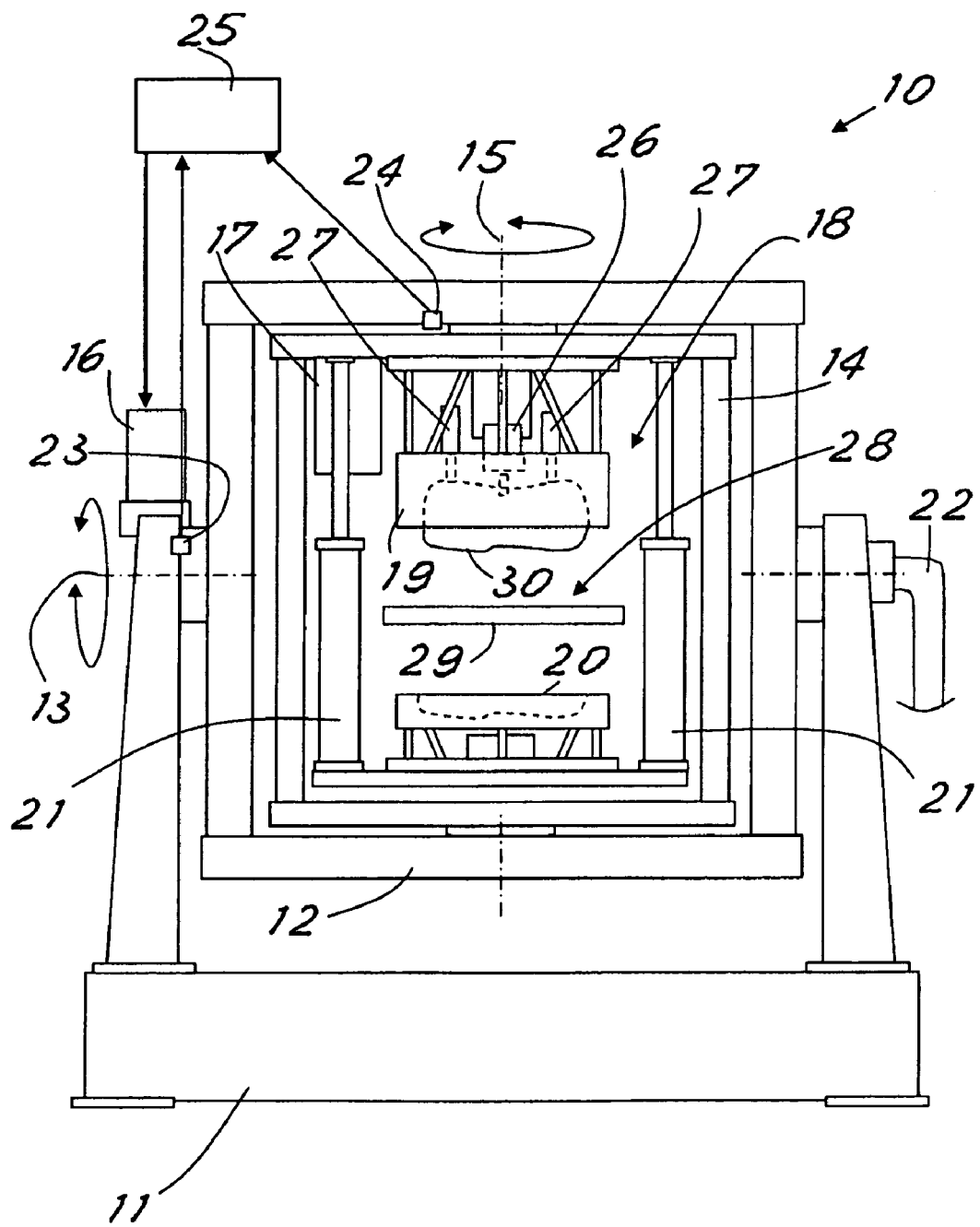
FIG. 1 is a frontal schematic view of a machine for rotational molding made according to the invention.

With reference to the figures, in FIG. 1 there is shown a machine for rotational molding, generally indicated by 10, made according to the invention. The machine 10 comprises a base frame 11 in which the rotating means of the mold is present. In particular, on the base frame 11 a first mobile frame 12 is supported that is rotatable around a horizontal driven axis 13. Inside the first movable frame 12 a second movable frame 14 is supported that is rotatable around a driven axis 15 that is orthogonal to the axis 13. Respective motors 16 and 17 control the rotation of the frames around the two axes 13 and 15.

Inside the second frame 14 the mold unit 18 is mounted, which comprises the two half molds 19, 20 which are mutually movable by means of linear actuators 21 to open and close the mold. The two half molds are heated by suitable direct heating means for layering the plastics that will be introduced therein during production of the products. Advantageously, the heating means comprises conduits (not shown) obtained between the mass of molds and in which the hot fluid was circulated (for example diathermal oil) arriving from a suitable source 22 through known rotating joints arranged coaxially to the rotation axes 13 and 15 of the frames. In order to accelerate the machine cycles, at the end of each heating cycle a suitable cooling fluid for cooling the molds can be sent from the source 22.

The machine comprises arresting means for arresting in a predetermined position the mold rotating means. This means is advantageously made with an electronic control unit 25 that at the end of the molding cycle commands the arrest of the rotating means (the motors 16 and 17) so that the mold unit is located in the desired discharge position.

The unit 25 can also be the programmable control unit of the entire machine, which drives rotation, heating and cooling of the mold and the various other automated features to achieve the complete molding cycles.

Advantageously, the arresting means may also comprise suitable known positioning sensors 23, 24 (for example, cam-driven switches when the correct position is reached) connected to the control unit 25 in order to identify precisely the reaching of the arrest position.

The machine also comprises means 26 for disengageable retaining of the product (indicated generally by 30) in a preset half mold when the mold is opened.

This prevents the product falling from the mold during the opening movement or remaining attached randomly and/or imprecisely to one or another half mold. Without the retaining means the position of the opening of the piece at the opening of the mold would be negatively influenced by various elements such as the shape of the piece and of the mold, the type and quality of the material used, the use or non-use of a detaching product for facilitating the detachment of the piece and with which the surface of the mold is treated and the manner in which/frequency with which such a product is applied.

As will become clear below, the position on the mold of the means 26 will be chosen in function of the product to be molded so as to lock the molded product in a known position and, at the moment of the opening of the mold, maintain the piece firmly in the desired position (overcoming all the above factors that could interfere negatively).

As will be clearer below, in addition to the retaining means 26 commandable detaching means 27 can also be provided that, if necessary, enable safe separating of the piece from the mold to be commanded at the desired moment. This may, for example, be necessary if, owing to the features of the material, the shape of the piece or other reasons, the product does not detach from the mold (for example through the effect of gravity alone) upon the release of the retaining means, but an active system is necessary that pushes the product forcibly outside the mold.

The machine comprises evacuating means 28 for evacuating the molded product that can be introduced between the half molds when the precise arrest position is reached and which operate in combination with the disengageable retaining means and possible detaching means for removing the molded product from the machine. The arresting position is advantageously with the opening direction of the mold vertical and facing the evacuating means.

Figure 2:
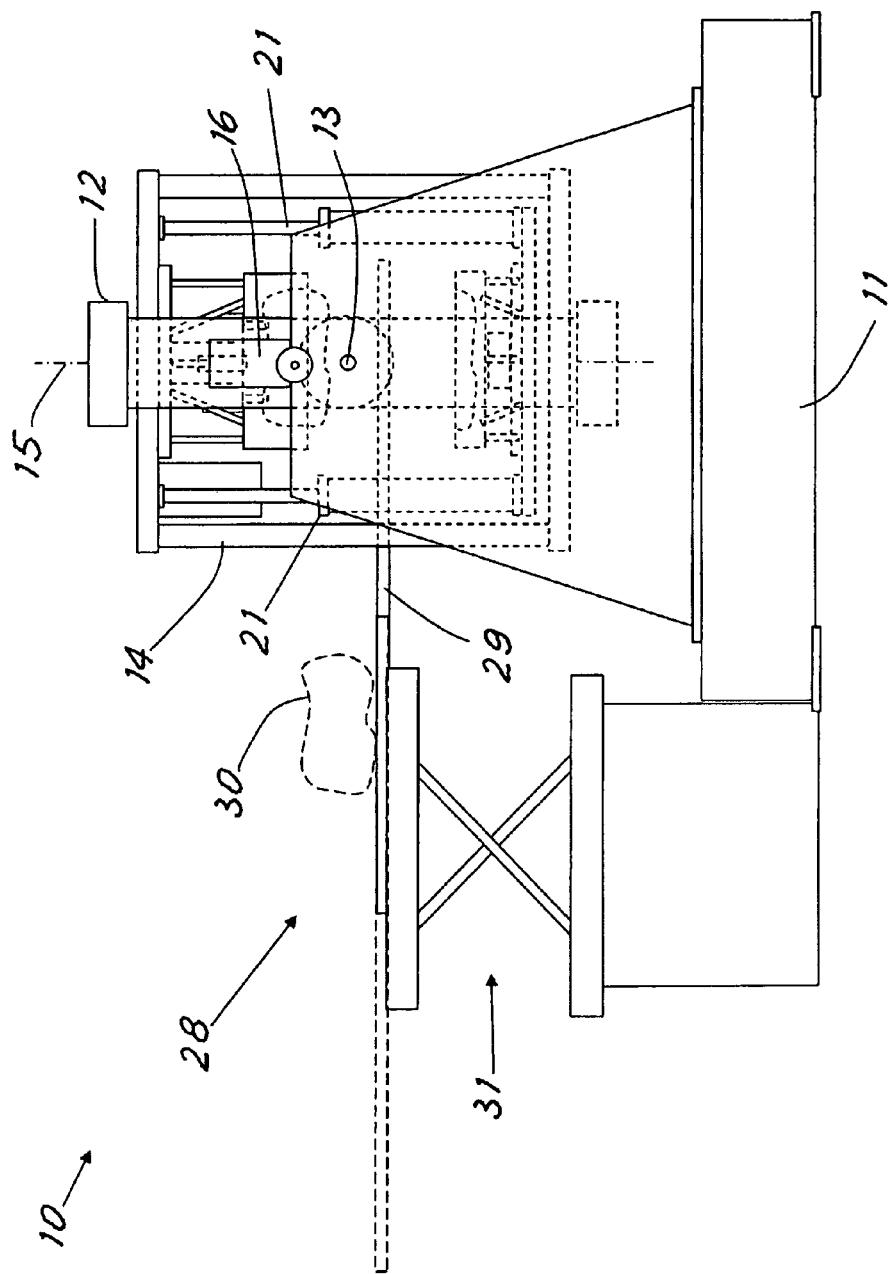
FIG. 2 is a lateral schematic view of the machine in FIG. 1.

As is also clear from FIG. 2, the evacuating means 28 comprises advantageously a horizontal removing table 29 that is inserted between the open half molds in an arrest position, with the retaining means 26 placed in the half mold that stops above the table. The table 29 is movable between a retracted position outside the machine (shown by a dotted line in FIG. 2) and an advanced removing position between the half molds. Advantageously, the movement is motor-driven.

The table can also be provided with a vertical movement by means of a known motor-driven elevator 31 (for example a pantograph), so as to be able to place itself immediately under the product anchored to the upper half mold and then accompany this product in the vertical outlet movement from the half mold. Once the table is in the retracted position, the vertical movement can continue to take the product to a suitable height for unloading the table In FIG. 2 there is shown an intermediate position of the vertical travel.

Also the evacuating means can be commanded by the control unit 25, so as to mold and evacuate the product in a completely automatic manner and with great optimization of cycle times.

Figure 3:
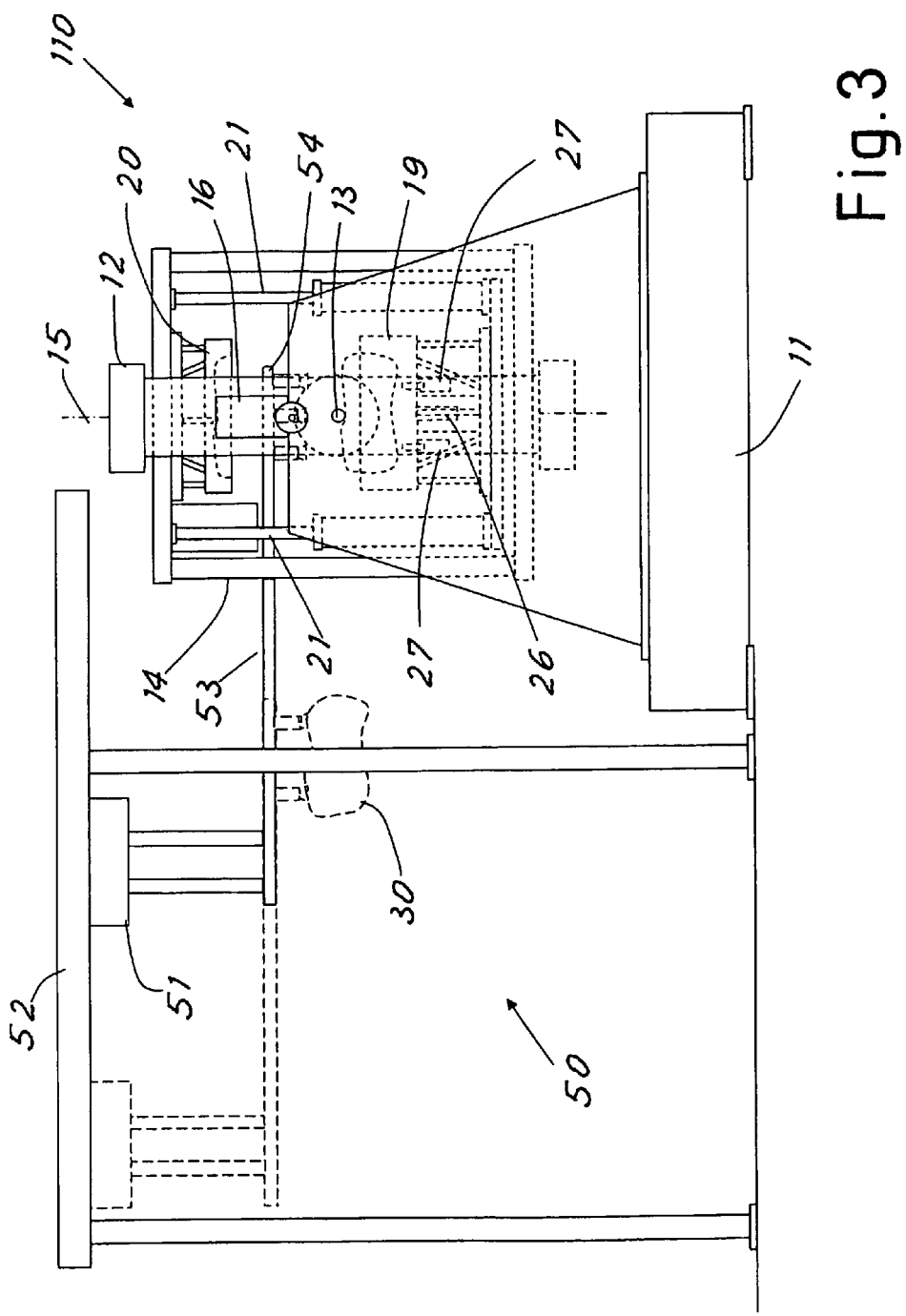
FIG. 3 is a lateral schematic view of a second embodiment of the machine according to the invention.

In FIG. 3 there is shown an alternative embodiment of the machine, in which the product evacuating means consists of a suction-cup removing unit 50. The rest of the machine is substantially the same as what has been shown and disclosed for FIG. 1 and the same numbering is thus used for the elements. In particular, the machine always comprises a half mold 19 provided with retaining means 26 and possible detaching means 27.

The unit 50 comprises a motor-driven carriage 51 that slides along a suspended rail 52 and supports a horizontal arm 53 terminating with a known removing head 54 provided with suction cups connected to a suitable vacuum source. The removing head can thus move between a position (shown by a dotted line) outside the rotational machine and a removing position in which it is superimposed on the half mold that retains the molded piece and which in this case is stopped in the lower position. The removing head can also move vertically or the lower half mold can be lifted by mold closing actuators so that the corresponding motion between the mold and removing head makes the suction cups adhere to the molded piece. The opposite vertical movement extracts the product from the half mold and the horizontal movement of the carriage 51 then takes the product outside the machine.

Figure 4:
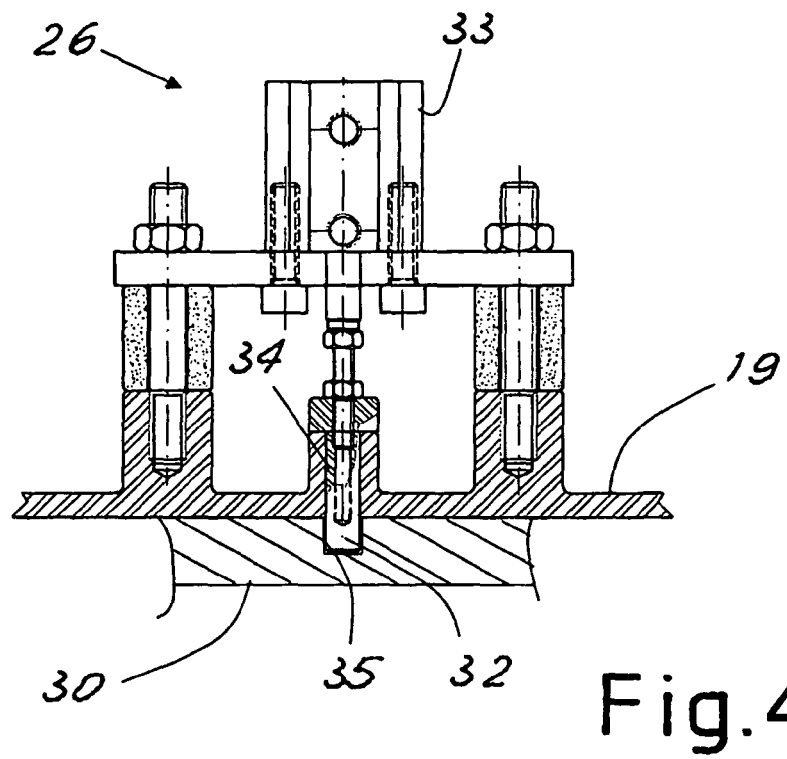
FIG. 4 is a schematic and partially sectioned view of a detail of the machine.

In FIG. 4 there is shown a possible embodiment of the retaining means 26. This embodiment comprises a pivot 32 of a suitable size (in function of the type of application, mechanical and thermal stress, etc., as will be easily imaginable by those skilled in the art) and of material suitable for enabling the material to be molded to coat the surface thereof during the molding step. The surface of the pivot can also be treated or shaped to more or less facilitate gripping.

The pivot 32 is inserted into the mold through a passage 34 in the wall of the mold made of a suitable diameter to enable the pivot to slide but to prevent the material inside the mold exiting. By means of a movement actuator 33 (of pneumatic or of hydraulic or of other type) the pivot 32 is axially movable between the inserted position (shown in FIG. 3) and a retracted position.

In the molding step the material in the mold covers the pivot, thus creating a seat 35 of plastics that becomes the hooking point between the pivot and the molded product.

As is easily imaginable by those skilled in the art, on the basis of the description given until now, the position of the retaining device has to be suitably defined to make the grip thereof effective (for example in function of the opening axis of the mold) and in order not to spoil the product on the basis of the functional features desired therefore. The devices may naturally be more than one or several pivots moved by a single actuator may be provided. This is specially useful in the case of molded pieces that have great dimensions or are particularly unbalanced.

When the mold opens, the pivot inserted into the material of the molded product acts as a stop for the product with respect to the mold part in which it is desired to retain the molded product and the system of removing the product can effectively start operations to remove the product.

Once the removing system is in the removing position the pivot is retracted by the movement mechanism thereof, liberating the product through extraction thereof.

In the case of an active removing system (i.e. that acts with mechanical force on the piece to extract the piece from the mold) the mechanism disclosed above can also not be moved. In this case the pivot can be dimensioned so as to create an undercut in the product that is sufficiently deep to ensure that the piece is fixed, but which is sufficiently yieldable to enable the piece to be extracted by a suitable extracting force.

This result is possible in consideration of the fact that the product, owing to the features of the material used and the thickness thereof, remains a piece that is sufficiently flexible to enable the piece to be slightly deformed during extraction. For example, in the case of extraction by lifting suction cups the lifting force can be such as to release the piece from the pivot.

Additionally, or alternatively, the thrust action of the detaching means 27 that releases the piece from the pivot can be used, which can thus be achieved or maintained fixed. In the latter case, the disengageable retaining means is made by the combination of a fixed pivot and of the detaching means.

Figure 5:
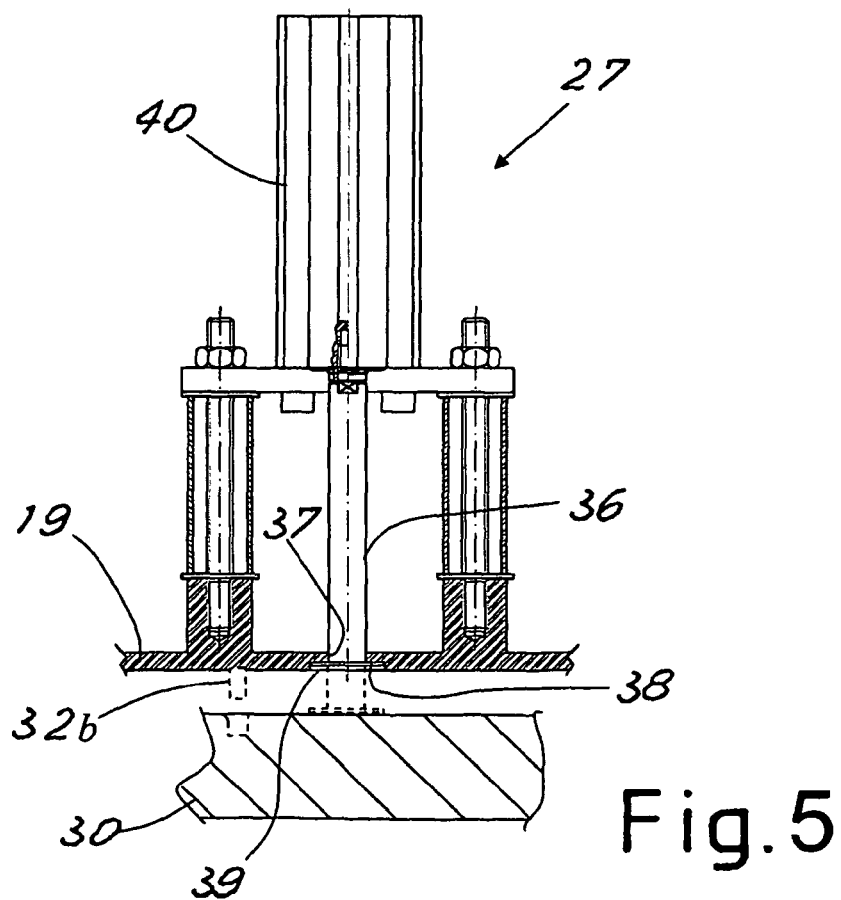
FIG. 5 is a schematic and partially sectioned view of another detail of the machine.

In FIG. 5 there is shown a possible embodiment of the detaching means 27. These detaching means 27 comprises a pivot 36 of suitable size (in function of the type of application, of the mechanical and heat stress, etc.) and of suitable material that passes smoothly through the wall of the mold through a passage 38. The pivot advantageously has a mushroom head 38 that in the rest position is received in a seat 39 in the mold so as not to interfere with the molding process. The sizing of the head of the pivot and of the seat and/or the lateral clearance between the pivot and the passage 37 are such as to prevent fluid material escaping from the mold when the pivot is retracted into the pivot seat.

A suitable linear actuator 40 (electrical pneumatic, etc.) commands the movement of the pivot 36 towards the inside of the mold (as shown by the dotted line in FIG. 5), so as to push the product to detach the product from the half mold and from the retaining pivots.

In FIG. 5 a dotted line shows a possible fixed retaining pivot 32b for cases in which releasable retaining means is made as a combination of a fixed pivot and of the thrust pivot 36.

In the molding step the material covers the head of the "fungus", thus creating a seat of plastics that becomes the thrust point between the pivot and the molded product. The position of this mechanism has to be properly defined to make the thrust thereof effective (in function of the opening axis of the mold), in order not to spoil the product on the basis of the functional features desired for the product and in order not to deform the product.

When the mold is open and retaining means has been retracted to free the product for extracting, the disclosed mechanism starts operation, pushing the molded product and forcing the molded to detach/exit from the mold.

At this point it is clear how the preset objectives have been reached, providing a rotational molding machine that enables extracting of the molded piece that is fast, easy and completely or partially automated.

Naturally, the disclosure made above of an embodiment applying the innovative principles of the present invention is provided by way of example of such innovative principles and must not therefore be taken to limit the scope of what is claimed herein.

The machine may, for example, comprise all those known elements that are auxiliary to rotational molding and which for the sake of simplicity have not been disclosed or shown here, as they are easily imaginable by those skilled in the art. Further, all the electrical, hydraulic, pneumatic, etc. connections that are directed to elements arranged on the rotating parts of the machine will have any transmission system that is suitable for enabling the machine to rotate freely. For example, rotating joints of electrical or fluid type can be provided that are arranged aligned on the rotation axes of the machine.

Other known devices for removing pieces can be used to meet specific needs, or the two shown here can be modified. For example, depending on the shape of the piece to be received, the table 29 may also comprise a container or other receiving support for receiving the piece molded and discharged by the half mold.

Further, molds can be made for molding several pieces simultaneously and/or several half molds can be provided that move reciprocally with the opening of the mold. Depending on the specific case, the positions of the half molds with the retaining means can be modified or reversed, as, for example, shown in the two embodiments disclosed above. Naturally, the thrust means for detaching the piece from the half molds can also be provided on the half molds that are devoid of retaining means.

The invention claimed is:

1. Machine for rotational molding of products, comprising means (12, 14, 16, 17) for motor-driven rotation of a mold around perpendicular axes (13, 15), means (22) for direct heating of the mold, means (21) for commanded opening of the mold in half molds, characterized in that it comprises in combination means (23, 24, 25) for arresting in a predetermined position mold rotating means, disengageable retaining means (26, 27) for retaining the product in a preset half mold, and evacuating means (28, 50) for evacuating the product that is suitable for being introduced between the open half molds when the rotating means is stopped in said predetermined position and which is suitable for receiving the product discharged by said preset half mold upon the release of the retaining means.

2. Machine according to claim 1, characterized in that the arresting means in a predetermined position comprises a control device (25) for controlling the rotation of the perpendicular axes (13, 15) which stops the axis to obtain the commanded opening of the mold in a substantially vertical direction and facing the evacuating means.

3. Machine according to claim 2, characterized in that the control device comprises sensors (23, 24) for detecting the reaching of the preset arrest position.

4. Machine according to claim 2, characterized in that the evacuating means comprises a table (29) for receiving the product that is movable between a non-operating retracted position and a position inserted between the open half molds and retaining means (26, 27) are placed in the upper half mold so as to enable the product to be released from the upper mold above the table in an inserted position.

5. Machine according to claim 4, characterized in that the evacuating means is movable in a vertical direction to accompany the product exiting the half mold.

6. Machine according to claim 2, characterized in that the evacuating means comprises a removing head (54) that is provided with suction cups and is movable between a non-operating retracted position and a inserted position between the open half molds and the retaining means is placed in the lower half mold so as to enable the product to be lifted from the lower half mold by the removing head.

7. Machine according to claim 1, characterized in that the rotating means comprises a first frame (12) rotating around a driven horizontal axis (13) and supporting rotatably a second frame (14) rotating around a second driven axis (15) perpendicular to the first, on the second frame there being mounted a mold unit (18) with the commanded opening means (21) of half molds (19, 20).

8. Machine according to claim 6, characterized in that the commanded opening means comprises linear actuators (21) that move with an alternating motion two half molds (19, 20) to open and close the mold.

9. Machine according to claim 1, characterized in that the direct heating means of the mold comprises conduits (22) for circulating heated fluid.

10. Machine according to claim 1, characterized in that the disengageable retaining means (26) of the product comprises a pivot (32) inserted into the mold to be covered by the material of the molded product.

11. Machine according to claim 10, characterized in that the pivot (32) is commanded by an actuator to move between an inserted position in the mold and a retracted position.

12. Machine according to claim 10, characterized in that it comprises thrust means (27) commanded to detach the product from the half mold.

13. Machine according to claim 12, characterized in that the thrust means (27) collaborates with retaining pivots (32, 32*b*) to make releasable retaining means.

14. Machine according to claim 12, characterized in that the thrust means comprises a thrust pivot (36) that is movable by means of an actuator (40) to take a head end (38) thereof from a retracted position near the internal wall of the mold to an advance thrust position towards the inside of the mold.

15. Machine according to claim 14, characterized in that the head end (38) of the thrust pivot (36) has a mushroom shape.

16. Machine according to claim 15, characterized in that the head end with a mushroom shape (38) is received in a seat (39) in the internal wall of the mold when it is in the retracted position.

* * * * *